United States Patent [19]

Suzuki et al.

[11] 4,100,370
[45] Jul. 11, 1978

[54] VOICE VERIFICATION SYSTEM BASED ON WORD PRONUNCIATION

[75] Inventors: Matsumi Suzuki; Saburo Kitamoto; Tetsuro Morino, all of Kanagawa, Japan

[73] Assignee: Fuji Xerox Co., Ltd., Tokyo, Japan

[21] Appl. No.: 750,323

[22] Filed: Dec. 13, 1976

[30] Foreign Application Priority Data

Dec. 15, 1975 [JP] Japan .............................. 50-149320

[51] Int. Cl.² .......................... G10L 1/00; G06F 15/34
[52] U.S. Cl. ............................... 179/1 SB; 179/1 SD; 340/146.3 T
[58] Field of Search ........................ 179/1 SB, 1 SD; 340/146.3 FT, 146.3 T

[56] References Cited

U.S. PATENT DOCUMENTS

| | | | |
|---|---|---|---|
| 3,275,986 | 9/1966 | Dunn | 340/146.3 T |
| 3,319,229 | 5/1967 | Fuhr et al. | 340/146.3 T |
| 3,457,552 | 7/1969 | Asendorf | 340/146.3 T |
| 3,634,822 | 1/1972 | Chow | 340/146.3 T |
| 3,770,892 | 11/1973 | Clapper | 179/1 SD |
| 3,816,722 | 6/1974 | Sakoe | 179/1 SD |
| 3,950,733 | 4/1976 | Cooper | 340/146.3 T |

*Primary Examiner*—Thomas W. Brown
*Assistant Examiner*—E. S. Kemeny
*Attorney, Agent, or Firm*—Sughrue, Rothwell, Mion, Zinn and Macpeak

[57] ABSTRACT

This system verifies the voice of a specific speaker (A) through verification of vocal sounds which form a previously-recorded recognition phrase spoken by A and others. Parallel filters derive a spectral characteristic parameter $x_i$ which contains weighting factors $\alpha_i$, $\beta_i$, and which represents a corresponding vocal sound $x_i$. Improved specificity over other speakers is attained by a Characteristic Feature Extractor which varies $\alpha_i$, $\beta_i$, through $p$ different values, thus deriving a set of $p$ parameters ($x_{ik}$) for each vocal sound $x_i$, thus allowing emphasis of the specific vocal sound $x_i$ as spoken by a specific speaker, over that of competing sounds and speakers.

1 Claim, 7 Drawing Figures

VOICE VERIFICATION SYSTEM BASED ON WORD PRONUNCIATION

BACKGROUND OF THE INVENTION

This invention relates in general to a word pronunciation voice verifying system for automatically verifying a plurality of words uttered by a speaker, and particularly to such a system for extracting the most recognizable characteristic feature from the voice.

The characteristic feature or parameter which has heretofore been employed in such a voice verifying system is extracted by a logic circuit based on the following formula:

$$x_i = \sum_{j=1}^{n} \alpha_j F_j - \sum_{j=1}^{n} \beta_j F_j - \tau_i \qquad (1)$$

where, when $$\begin{cases} x_i > 0 & x_i = 1, \text{ and} \\ x_i \leq 0 & x_i = 0 \end{cases} \qquad (2)$$

In the formula given above, $x_i$ is a characteristic parameter corresponding to a specified vocal sound $x_i$; $F_j$ is the output of a band pass filter for extracting a desired voice frequency; $\gamma_i$ is a threshold value; $\alpha_j$, $\beta_j$ are weights added to the band pass filter. The component $\Sigma \beta_j F_j$ characterizes vocal sounds which are liable to be confused with a vocal sound $x_i$ and produce an error, and such component is therefore subtracted from the component $\Sigma \alpha_j F_j$ characterizing the vocal sound $x_i$. If the value thus obtained is larger than a predetermined threshold value $\gamma_i$, it is used as a characteristic parameter which characterizes the vocal sound $x_i$ so that a high verification accuracy can be obtained. The characteristic parameter extracted by formulas (1) and (2) can provide a highly stable verification for a specified individual for whom the weights $\alpha_j$, $\beta_j$ and the threshold value $\gamma_i$ are previously set, but lacks stability when the speaker is replaced by another person. Thus, the prior art system is not suitable for the verification of a number of different speakers.

SUMMARY OF THE INVENTION

The object of the present invention is to eliminate the above-mentioned disadvantages by providing a word pronunciation voice verifying system having a unit for extracting a highly stable characteristic parameter for a number of speakers.

The system of the present invention comprises, as shown by the block diagram of FIG. 1, a unit 1 for standardizing the level of the input voice uttered by a speaker whose voice is to be verified, a frequency analyzing unit 2 for analyzing the standardized voice signal by a plurality of parallel channels each having a different band pass frequency, a sample and hold unit 3 for detecting the output level of each of the plurality of channels and holding the maximum value during a sampling time for each of the channels, a characteristic feature extracting unit 4 for adding various weights to the output $F_j$ of each of the channels in the detected frequency bands to extract vocal sound information required for the verification, a gate unit 5, responsive to a signal from a parameter discriminating unit 13, for selecting the parameter to be transmitted out of the time series patterns for each of the input voices extracted by the characteristic feature extracting unit 4, a memory unit 6 for storing the characteristic parameter pattern which has passed through the selective gate unit 5, a binary reference parameter memory unit 12 for storing the time series pattern of the characteristic parameter previously extracted from the voice of a reference speaker "A," a first resemblance calculator unit 11 for calculating the resemblance between the parameters of the patterns stored in the memory unit 6 and the reference parameter memory unit 12, respectively, a discriminating unit 13 for selecting a suitable parameter corresponding to a maximum resemblance based on the result of said resemblance calculation, sending out a selective signal relative to the suitable parameter to the selective gate unit 5 and storing said parameter selective signal therein, a second resemblance calculator unit 7 for calculating, by a pattern matching process, the resemblance between the unknown input pattern to be verified, stored in the memory unit 6, and the reference parameter, stored in the memory unit 12, and a discriminating and output unit 8 for discriminating the vocabulary by regarding the reference pattern, consisting of reference parameters corresponding to the maximum resemblance derived from the result of said resemblance calculation, as an input pattern and sending out the result of the discrimination as an output.

DETAILED DESCRIPTION OF THE PREFERRED EMBODIMENTS

Figure 1:
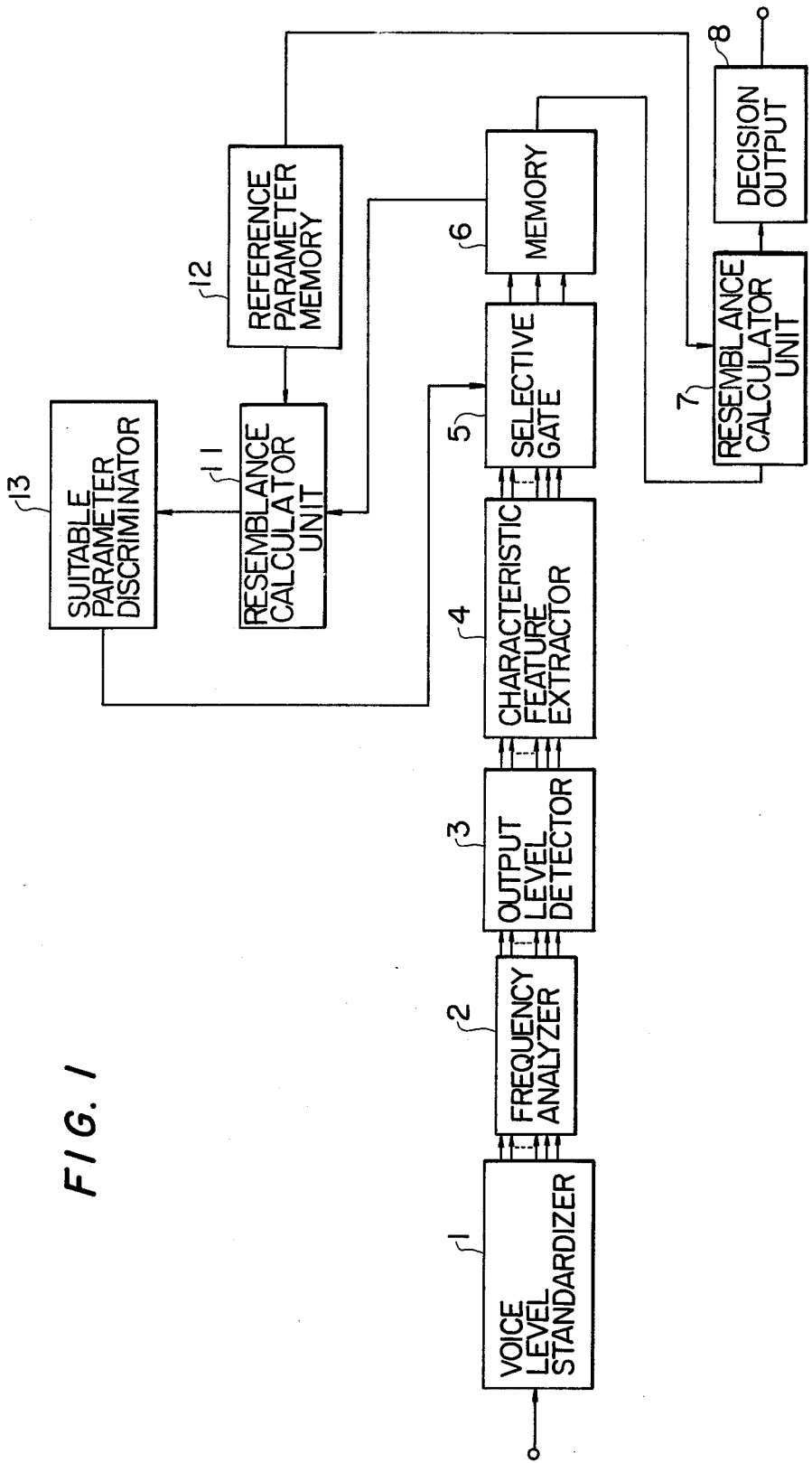
FIG. 1 is a block diagram of a voice verifying system according to a first embodiment of the present invention.

The verification system shown in FIG. 1 and broadly cataloged above will now be described in detail with reference to FIGS. 2–6.

Figure 2:
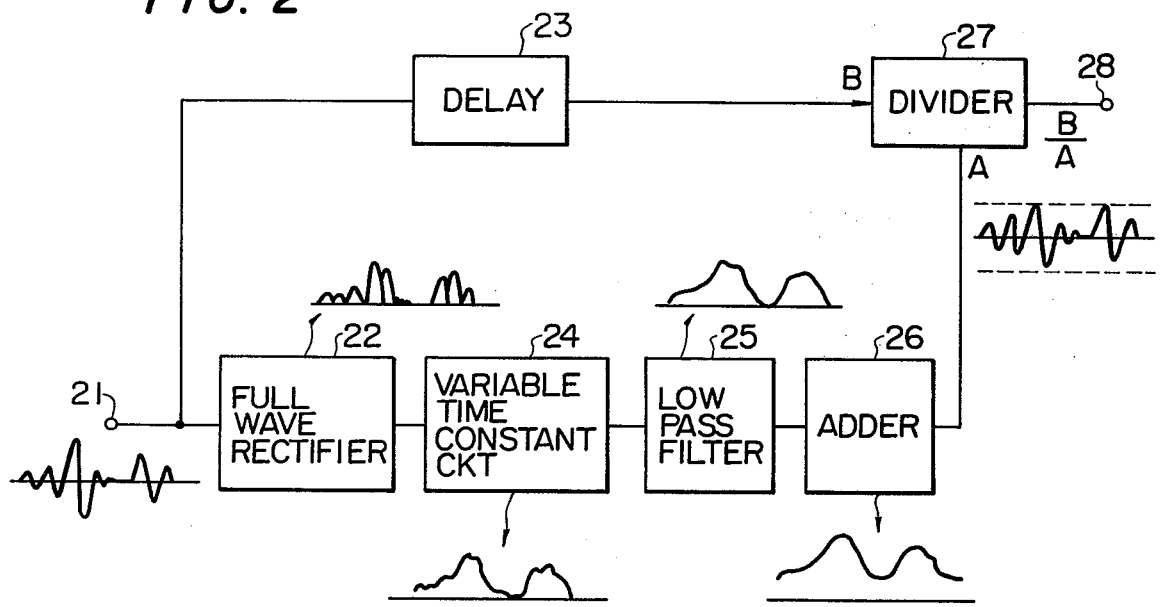
FIG. 2 is a more detailed block diagram of the voice level standardizing unit shown in FIG. 1.

The voice level standardizing unit 1 consists of an AGC circuit adapted to standardize the voice input level of a speaker to be verified and transmit the standardized voice signal to the frequency analyzer unit 2. It must have a sufficiently fast response characteristic to follow even abrupt changes in the level of the input voice wave. FIG. 2 is a block diagram of one example of such a unit showing the waveform patterns at various stages. An input voice wave applied to a terminal 21 is fed to a full wave rectifier 22 and a delay circuit 23. A variable time constant circuit 24 produces an approximate envelope of the output waveform from the rectifier 22. A low pass filter (LPF) 25 eliminates any unevenness still remaining in the output of the variable time constant circuit 24, thereby producing a more smoothly shaped envelope. An adder circuit 26 adds a direct current component to the envelope output so that no zero level signal is used as a divisor in the divider circuit 27. A delay circuit 23 provides the input voice wave with a time delay equal to that of the envelope output whereby the time patterns of the two signals correspond to each other. The delayed input voice wave is fed to the divider means 27, and a standardized output is obtained at output terminal 28 in which the peak value of the input voice wave is confined to the envelope and kept at a nearly constant level.

Figure 3:
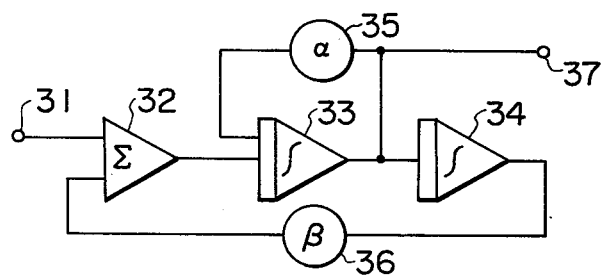
FIG. 3 is a block diagram of a single analog filter which may be used in the frequency analyzer unit 2, shown in FIG. 1, FIGS. 4, 5 and 6 are block diagrams of the characteristic feature extracting unit.

The frequency analyzer unit 2 consists of a group of active filters each having a plurality of channels (13 channels in this embodiment), and is adapted to spectrum analyze the standardized voice signal. FIG. 3 is a block diagram showing the arrangement of an analog filter particularly suitable for the present invention. Reference numeral 31 denotes an input terminal, 32 an adder, 33, 34 integrators, 35, 36 potentiometers, and 37 an output terminal. Its transmission coefficient G(S) is given by the following formula:

$$G(S) = \frac{TS}{(TS)_2 + \alpha TS + \beta},$$

where T is the time constant of the integrators, and $\alpha$ and $\beta$ are the potentiometer coefficients.

Such an analog filter is simple in construction as compared with a digital filter, and spectrum analysis can be easily effected thereby. Needless to say, however, any other type of filter can be used in the present invention.

The output level detector 3 samples the output of each of the channels of the frequency analyzer unit 2 in a proper time interval, for example, a sampling period of 10 ms, and holds the peak value thereof. With a sampling period of about 10 ms, the output of the filter can be easily sampled even in the range of consonant sounds.

The characteristic feature extracting unit 4 is arranged to render the weights $\alpha_j$ and $\beta_j$ given in formula (1) variable to suit the individual speaker in order to extract the most suitable parameter exactly corresponding to a deviation in characteristic parameters due to individual differences between speakers. Accordingly, $p$ sets of different characteristic parameters are prepared for one vocal sound $x_i$. More specifically, formula (1) can be expanded as follows:

$$\begin{pmatrix} x_1 \\ x_2 \\ \vdots \\ x_i \end{pmatrix} = \begin{pmatrix} x_{10}, x_{11}, x_{12}, \ldots, x_{1k}, \ldots; x_{1p-1} \\ x_{20}, x_{21}, x_{22}, \ldots; x_{2k}, \ldots; x_{2\,p-1} \\ \vdots \\ x_{10}, x_{11}, x_{12}, \ldots; x_{i\,k}, \ldots; x_{ip-1} \end{pmatrix}, \quad (3)$$

where $x_{ik}$ is the $k$ th of the $p$ sets of characteristic parameters produced for the vocal sound $x_i$, and can be expressed by the following formulas:

$$x_{ik} = \sum_{j=1}^{n} \alpha_{jk} F_j - \sum_{j=1}^{n} \beta_{jk} F_j - \tau_{ik} \quad (4)$$

wherein, when $x_{ik} > 0$ then $x_{ik} = 1$, and
when $x_{ik} \leqq 0$ then $x_{ik} = 0$. \quad (5)

In formulas (3) to (5) above, "$i$" is the number of vocal sounds "$x$" to be verified, "$n$" is the number of output channels of the output level detector 3, and "$p$" is the number of characteristic parameters prepared for one vocal sound depending on the required accuracy rate of the verification and the number of speakers to be verified. $\alpha_{jk}$ and $\beta_{jk}$ are weights for the $k$ th characteristic parameter $x_{ik}$ selected by the same method as the weights $\alpha_j$ and $\beta_j$ in order to emphasize the characteristic feature of the vocal sound $x_i$, thereby enabling verification to be made easily and accurately. $\gamma_{ik}$ is a threshold value of the parameter $x_{ik}$. Stated more specifically, according to the present invention, the assembly of $p$ sets of characteristic parameters as shown on the right side of formula (3); that is $\{x_{i0}, x_{i1}, x_{i2} \ldots x_{ik} \ldots x_{ip-1}\}$, can be obtained by permitting the value of the weights $\alpha_j$ and $\beta_j$ given in formula (1) to slowly change. $x_{ik}$ is the $k$ th parameter as counted from the parameter $x_{i0}$ in the above-mentioned assembly.

In formula (4), expanded in the same manner as formula (1), $$\sum_{j=1}^{n} \alpha_{jk} F_j$$

is a component characterizing the vocal sound $x_i$, while $$\sum_{j=1}^{n} \beta_{jk} F_j$$

is a component which is liable to be confused with $$\sum_{j=1}^{n} \alpha_{jk} F_j$$

and cause an erronious verification.

If the input vocabulary is assumed to have characteristic parameters $x_1, x_2, \ldots x_5$ given by formula (1) corresponding to the five vowels $|a|$, $|i|$, $|u|$, $|e|$, $|o|$, and the values of the weights $\alpha_j$, $\beta_j$ of these parameters are allowed to slowly change for a speaker "A" who is selected as a reference, as indicated in Table 1, to provide a number of additional characteristic parameters, and when $p=2$ and $\gamma=0.05$, it was found that all of the characteristic parameters additively provided for fifty optionally selected adult men include parameters suitable for the respective speakers.

This clearly indicates that the method of the invention is very effective for a great many speakers. Further, when the speaker is a woman or a child, parameters suitable for the voice of women and children can be obtained by somewhat changing the connections between the characteristic feature extraction unit 4 and the filter output channels. Thus, Table 1 is shown by way of example only and is not intended to limit the scope of the present invention.

Table 1

| characteristic parameter $x_i$ | Changes of Weights $\alpha_j \beta_j$ of Characteristic Parameters | |
|---|---|---|
| | changes of weight $\alpha_{jk}$ | changes of weight $\beta_{jk}$ |
| $x_1$ | $\alpha_{1k}=\alpha_1 \pm Kr\alpha_1$ | $\beta_{1K}=\beta_1 \mp Kr\beta_1$ |
| $x_2$ | $\alpha_{2k}=\alpha_2 \pm Kr\alpha_2$ | $\beta_{2K}=\beta_2 \mp Kr\beta_2$ |
| $x_3$ | $\alpha_{3k}=\alpha_3 \pm Kr\alpha_3$ | $\beta_{3K}=\beta_3 \mp Kr\beta_3$ |
| $x_4$ | $\alpha_{4k}=\alpha_4 \pm Kr\alpha_4$ | $\beta_{4K}=\beta_4 \mp Kr\beta_4$ |
| $x_5$ | $\alpha_{5k}=\alpha_5 \pm Kr\alpha_5$ | $\beta_{5K}=\beta_5 \mp Kr\beta_5$ |

$K = 0, 1, 2, \ldots P - 1$

As may be seen from formula (4), the characteristic parameters extracted by formulas (4) and (5) can be made linear, and a suitable adder circuit can be easily constituted by analog operational elements and a Schmitt trigger circuit. Further, as is clear from formula (5), the output of this circuit is a binary signal, whereby it is extremely convenient for digital processing.

Figure 4:
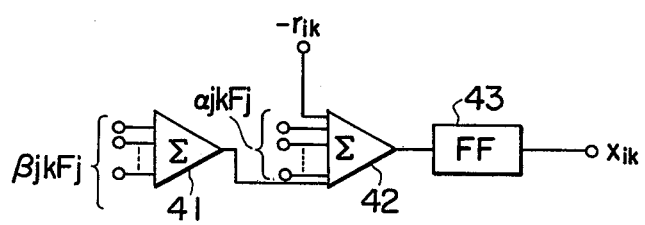

FIG. 4 is a block diagram showing one embodiment of a threshold value logic circuit constituting the characteristic feature extracting unit 4. Such a circuit comprises two adders 41, 42, consisting of analog operational elements, and a Schmitt trigger circuit 43 fed by the output of adder 42, whereby the characteristic parameter $x_{ik}$ is obtained at the output. Accordingly, $i$ times $p$ sets of similar threshold value logic circuits are required for the characteristic feature extracting unit 4.

Figure 5:
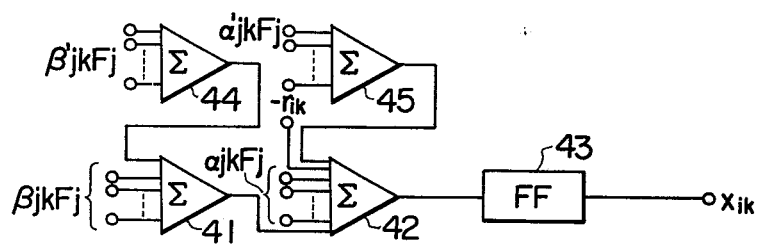
Figure 6:
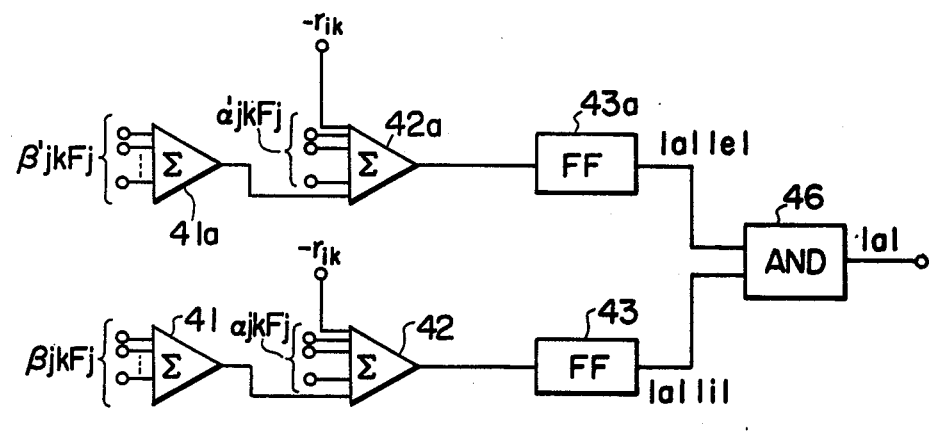

In FIG. 4, when an error occurs in which the parameter $x_{ik}$ of the output signal produces not only an output in response to a predetermined vocal sound X, but also an output in response to another vocal sound Y, or when it is difficult to produce an output in response to the predetermined vocal sound X, then the component of the vocal sound Y or the component of the vocal sound X can be separately extracted by using the additional adders 44, 45 as shown in FIG. 5, and the extracted component can be supplied to the adder 41 for $\beta_j F_j$ or the adder 42 for $\alpha_j F_j$, thereby correcting or intensifying the output. Further, as shown in FIG. 6, circuits 41a, 42a, 43a having the same arrangement as those of FIG. 4 but with different weights can be provided, and the outputs supplied to an AND circuit 46, thereby extracting only the parameter for the vocal sound X. More specifically, even if an error is caused between the vocal sounds |a| and |i| in circuits 41, 42, 43, while an error also occurs between the vocal sounds |a| and |e| in circuits 41a, 42a, 43a, only the vocal sound |a| appears at the output of the AND circuit 46, whereby the occurrence of errors can be completely prevented.

The selective gate unit 5 consists of an AND circuit. The characteristic parameter $x_{ik}$ obtained by formula (4) is fed in as one input, and a selective signal (its details will be mentioned later) relative to the characteristic parameter is applied as another input. Therefore, only the characteristic parameters which correspond to the selective signal are passed through the selective gate unit and transmitted to the memory unit 6 where they are stored.

The memory unit 6 consists of a R A M (Random Access Memory) adapted to store binary time series patterns which have passed through the selective gate unit 5.

The reference parameter memory unit 12 consists of a P R O M (Programable Read Only Memory) adapted to store time series reference parameter patterns extracted by the characteristic feature extracting unit 4, to which the voice uttered by a reference speaker "A" is fed as a reference voice input.

The first resemblance calculator unit 11 is adapted to calculate the resemblance between the characteristic parameter extracted by the unit 4, to which the voice uttered by a speaker "a" to be verified is fed as an input, and the reference parameter, for the purpose of selecting a characteristic parameter most suitable for speaker "a". Since both parameters are binary signals, the Hamming distance process can be used to calculate the resemblance. When the reference speaker "A" utters the same words as speaker "a", who is to be verified, the extracted characteristic parameters $x_1, x_2, \ldots x_i$ form a binary time series pattern for the respective vocabulary $Y_m$. The pattern can be expressed by the following formula:

$$Y_m = \{y_m(t) | x_1(t_{ym}), x_2(t_{ym}), x_i(t_{ym})\} \quad (6)$$

where $m = 1, 2, \ldots, q$ $q$ = the number of words in the input vocabulary or recognition phrase, and $i$ = the number of vocal sounds included in the vocabulary $Y_m$.

In formula (6) above, $Y_m$ is the input vocabulary to be verified, for example, $Y_1$;/one/, $Y_2$;/two/, $Y_3$;/three/, ..., $Y_q$;/multiple/etc., and $Y_m$ is a time series pattern consisting of characteristic parameters $x_1(t_{ym}), x_2(t_{ym}), \ldots, x_i(t_{ym})$ corresponding to the vocabulary $Y_m$, and is also a time pattern "t".

When speaker "a" utters the reference vocabulary, the characteristic parameter extracted by unit 4 is given by the right half of formula (3), and it can be detected by the following formula:

$$Y_m = \{y'_m(t) | x_{10}(t_{ym}), x_{11}(t_{ym}), \ldots, x_{1k}(t_{ym}), \ldots,$$
$$x_{1p-1}(t_{ym}), x_{20}(t_{ym}), x_{21}(t_{ym}), \ldots, x_{2k}(t_{ym}), \ldots,$$
$$x_{2p-1}(t_{ym}), \ldots, x_{i0}(t_{ym}), x_{i1}(t_{ym}), \ldots, x_{ik}(t_{ym}), \ldots$$
$$, x_{ip-1}(t_{ym})\} \quad (7)$$

where $m = 1, 2, \ldots, q$

In formula (7), $Y_m(t)$ is a time series pattern corresponding to the vocabulary $Y_m$ which includes the characteristic parameter suitable for verifying the words uttered by speaker "a" with minimum error. More specifically, each of the parameter assemblies expressed by $\{x_{10}(t_{ym}), x_{11}(t_{ym}), \ldots, x_{1p-1}(t_{ym})\}$ $\{x_{20}(t_{ym}), x_{21}(t_{ym}), \ldots, x_{2p-1}(t_{ym})\} \ldots \{x_{i0}(t_{ym}), x_{i1}(t_{ym}), \ldots, x_{ip-1}(t_{ym})\}$ should include at least one such suitable parameter. In order to select these suitable parameters, the resemblance or degree of correspondence between the reference parameters of speaker "A" and the characteristic parameter of speaker "a" can be calculated as follows. First, in order to select a suitable parameter out of the assembly $\{x_{10}(t_{ym}), x_{11}(t_{ym}), \ldots, x_{1p-1}(t_{ym})\}$, it is necessary to find a Hamming distance between $x_{1k}(t_{ym})$ and $x_1(t_{ym})$. For example, the digits forming each parameter can be applied to a NAND circuit, and their sum can be expressed as a Hamming distance $S_{1k}$ as follows:

$$\left.\begin{aligned} S_{10} &= \sum_{m=1}^{q} \phi(x_{10}(t_{ym}), x_1(t_{ym})) \\ S_{11} &= \sum_{m=1}^{q} \phi(x_{11}(t_{ym}), x_1(t_{ym})) \\ &\vdots \\ S_{1k} &= \sum_{m=1}^{q} \phi(x_{1k}(t_{ym}), x_1(t_{ym})) \\ &\vdots \\ S_{1p-1} &= \sum_{m=1}^{q} \phi(x_{1p-1}(t_{ym}), x_1(t_{ym})), \end{aligned}\right\} \quad (8)$$

where $\phi(x_{10}(t_{ym}), x_1(t_{ym}))$ is the resemblance between the parameters $x_{10}(t_{ym})$ and $x_1(t_{ym})$ in the input vocabulary $Y_m$. Accordingly, $S_{10}$ is the sum of the resemblances in the respective vocabulary. Further, $\phi(x_{11}(t_{ym}), x_1(t_{ym}))$ is the resemblance between the parameters $x_{11}(t_{ym})$ and $x_1(t_{ym})$, and $S_{11}$ is the sum thereof. Similarly, $S_{1p-1}$ shows the sum of the resemblances between the parameters $x_{1p-1}(t_{ym})$ and $x_1(t_{ym})$.

If the maximum resemblance sum among the total sums $S_{10}, S_{11}, \ldots, S_{1p-1}$ in formula (8) is assumed to be $S_{1k}$, then the parameter of $S_{1k}$ is the most suitable one for verifying the voice of speaker "a" with minimum error. The selected parameter represents the most recognizable characteristic in the entire input vocabulary, whereby a highly stable characteristic parameter can be selected for a given input vocabulary. In a similar manner, regarding $\{x_{20}(t_{y'm}), x_{21}(t_{y'm}), \ldots, x_{2p-1}(t_{y'm})\}, \ldots, \{x_{k0}(t_{y'm}), x_{k1}(t_{y'm}), \ldots, x_{kp-1}(t_{y'm})\}, \ldots, \{x_{i0}(t_{y'm}), x_{i1}(t_{y'm}), \ldots, x_{ip-1}(t_{y'm})\}$, a suitable parameter can be selected among each of the parameter assemblies by determining the resemblances between them and $x_2(t_{ym}), \ldots, x_k(t_{ym}), \ldots, x_i(t_{ym})$.

The suitable parameter discriminating unit 13 is adapted to discriminate the parameter having the maximum resemblance sum among all of the resemblances calculated by the first resemblance calculator unit 11 and store the latter therein. The discriminating unit 13 sends out a code signal corresponding to the suitable parameter as a parameter selective signal to the selective gate unit 5.

In discriminating a suitable parameter, it is not always necessary to use all of the input vocabulary words. For example, if only 10 out of 50 words are used, a suitable parameter can be obtained.

If the characteristic pattern is recomposed in relation to formula (7) considering only the suitable parameter, the following formula results:

$$Y_m = \{y''_m(t) \mid x_{1K}(t_{y'm}), x_{2K}(t_{y'm}), \ldots, x_{iK}(t_{y'm})\} \quad (9)$$

where $m = 1, 2, \ldots, q$

In formula (9), "$q$" is the number of words in the input vocabulary, "$i$" is the number of vocal sounds included in the $m$ th word $Y_m$, and $x_{1K}(t_{y'm}), x_{2K}(t_{y'm}), \ldots, x_{iK}(t_{y'm})$ are suitable parameters. The pattern obtained with formula (9) can be used as a parameter selective signal for the speaker "a."

The second resemblance calculator unit 7 calculates the resemblance between the reference pattern, consisting of reference parameters stored in the reference parameter memory unit 12, and an unknown pattern extracted from the voice of speaker "a" to find a Hamming distance between the two patterns, and transmits the calculated resemblance to a discriminating and output unit 8. The latter discriminates the reference pattern corresponding to the maximum resemblance, and sends out a word corresponding to the latter as an output.

In verifying words or vocabularies by the system of the present invention, a learning function is first necessary. More specifically, when speaker "a" initially utters all or part of the words or vocabularies to be verified, his voice input is applied to the voice level standardizing unit so that the time series patterns of characteristic parameters expressed by formula (7) can be obtained by the characteristic feature extracting unit. At that time the selective gate unit 5 is fully opened so that the time series patterns are all sent to the memory unit 6, and then transmitted to the first resemblance calculator unit 11 where a suitable parameter given by formula (9) is determined. A parameter selective signal corresponding to the suitable parameter is stored in the suitable parameter discriminating unit, thereby completing the learning function.

In verifying vocabularies, when speaker "a" subsequently utters a vocabulary, the time series pattern of the characteristic parameter expressed by formula (7) is transmitted to the selective gate unit 5 as before. At that time, a parameter selective signal from the suitable parameter discriminating unit 13 is applied to the gate unit 5, and therefore only the gate corresponding to the reference pattern expressed by formula (9) is opened. Therefore, only the most suitable or recognizable parameter for speaker "a" passes through the gate unit 5 and reaches the second resemblance calculator unit 7, where it is compared with the reference pattern to thereby enable the words or vocabulary uttered by speaker "a" to be verified.

With the invention constructed as developed above, the system can be implemented by a simple circuit arrangement, and a high verification accuracy rate can be obtained by extracting a stable characteristic parameter for a great many speakers.

In particular, when effecting pattern matching a Hamming distance process can be applied by coding characteristic parameters into binary signals so that the processing mechanism for discriminating the vocabulary at the final stage can be greatly simplified. Further, in obtaining an optimum pattern match, the time axis and poke operation can be increased and reduced as with previous pattern processing.

A suitable parameter can usually be selected by having the speaker utter only part of the complete vocabulary selected at the time of learning, and therefore the learning time can be considerably reduced. According to experiments, it has been found that uttering only 10 out of 50 vocabulary words enables the use of the system.

Figure 7:
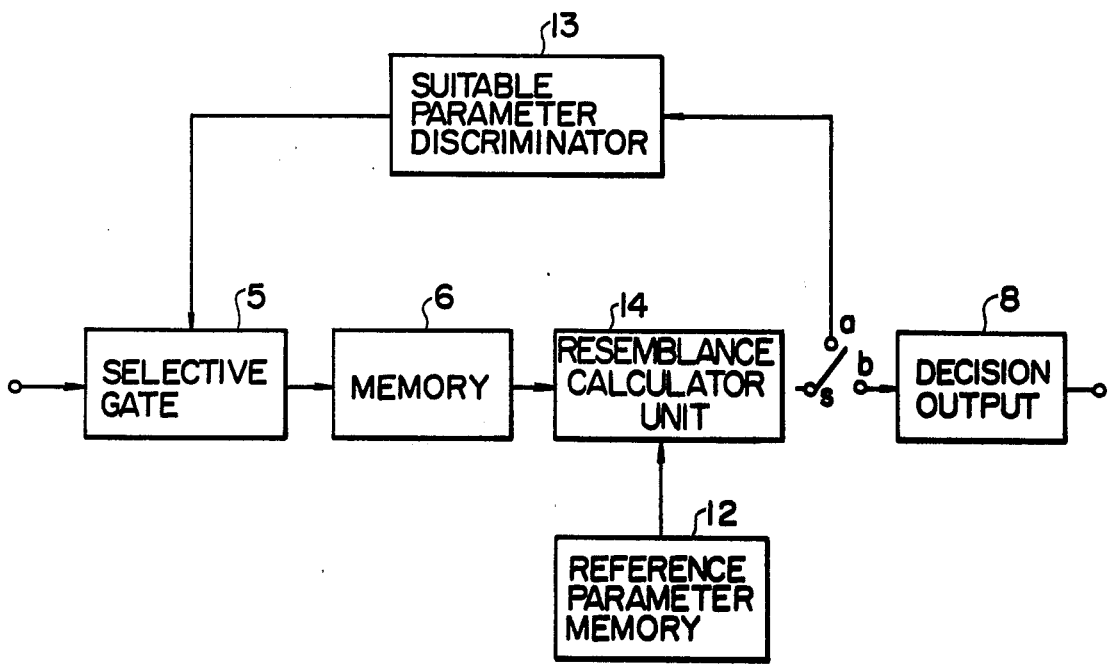
FIG. 7 is a block diagram showing the principal components of another embodiment of the present invention.

As is obvious from the foregoing description, the first and second resemblance calculator units 11, 7 have similar functions, so that, as shown in FIG. 7, the two units can be replaced by a single resemblance calculator unit 14 whose output is selectively switched to the discriminating units 8 and 13. In FIG. 7, the same reference numerals employed in FIG. 1 indicate the same components.

What is claimed is:

1. A word pronunciation voice verifying system, comprising: a voice level standardizing unit for standardizing the input voice level of a speaker whose voice is to be verified, a frequency analyzer unit for analyzing the standardized voice signal and including a plurality of parallel channels each having a different band pass frequency, an output level detector unit for detecting the output level of each of the plurality of channels, a characteristic feature extracting unit for extracting a plurality of characteristic parameters for one vocal sound from the detected output, a selective gate unit for selecting the parameter to be transmitted, based on a parameter selective signal, out of a plurality of characteristic parameters consisting of binary time series patterns for each of the input voices extracted by the characteristic feature extracting unit, a memory unit for storing the characteristic parameter pattern which has passed through the selective gate unit, a reference parameter memory unit for storing the binary time series pattern of the reference parameter, resemblance calculator units for calculating the resemblance between the parameters of the patterns stored in the memory unit and the reference parameter memory unit, respectively, and for calculating the resemblance between the input pattern which has passed through the selective gate and the time series pattern stored in the reference parameter memory unit, a suitable parameter discriminating unit for selecting a suitable parameter corresponding to a maximum resemblance based on the results of the calculation of the resemblance between the contents stored in the memory unit and the reference parameter memory unit by the resemblance calculator units, and for sending out a selective signal relative to the suitable parameter to the selective gate unit and the memory unit, and a discriminating and output unit for discriminating the vocabulary with regard to the pattern of the reference parameter corresponding to the maximum resemblance derived from the results of the calculation of the resemblance between the input pattern and the reference parameter by the resemblance calculator units, and for sending out the result of the discrimination as an output.

* * * * *